(12) United States Patent
Lee et al.

(10) Patent No.: US 7,715,667 B2
(45) Date of Patent: May 11, 2010

(54) METAL WAVEGUIDE DEVICE AND NANO PLASMONIC INTEGRATED CIRCUITS AND OPTICAL INTEGRATED CIRCUIT MODULE USING THE SAME

(75) Inventors: Myung Hyun Lee, Seoul (KR); Hae Ryeong Park, Hwaseong-si (KR)

(73) Assignee: Sungkyunkwan University Foundation for Corporate Collaboration, Cheoncheon-dong, Jangan-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 12/388,646

(22) Filed: Feb. 19, 2009

(65) Prior Publication Data
US 2009/0214159 A1    Aug. 27, 2009

(30) Foreign Application Priority Data
Feb. 26, 2008 (KR) .................. 10-2008-0017307
Jan. 14, 2009  (KR) .................. 10-2009-0003057

(51) Int. Cl.
G02B 6/12    (2006.01)
G02B 6/26    (2006.01)
G02B 6/10    (2006.01)

(52) U.S. Cl. ..................... 385/14; 385/31; 385/130

(58) Field of Classification Search ............ 385/14, 385/129, 130, 31
See application file for complete search history.

(56) References Cited

U.S. PATENT DOCUMENTS 6,914,999 B2 * 7/2005 Breukelaar et al. ............ 385/20
2009/0136190 A1 * 5/2009 Berini et al. .................. 385/130

OTHER PUBLICATIONS

Verhagen, E., A. Polman, L. Kuipers, "Nanofocusing in laterally tapered plasmonic waveguides", Optics Experss, V. 16, No. 1, 45-57 (2008).*

* cited by examiner

*Primary Examiner*—Charlie Peng

(57) ABSTRACT

Disclosed is a metal waveguide device, and nano plasmonic integrated circuits and an optical integrated circuit module using the same. The nano plasmonic integrated circuit module includes an input coupling unit, an input focusing unit, a surface plasmon polariton waveguide for guiding surface plasmon polaritons, a signal sensing/processing unit, an output defocusing unit, and an output coupling unit for converting surface plasmon polariton signals into optical signals. The optical integrated circuit module includes the nano plasmonic integrated circuit module, thus realizing highly integrated photonic circuits having a micro structure, low power consumption and low price.

23 Claims, 13 Drawing Sheets

(a)

(b)

METAL WAVEGUIDE DEVICE AND NANO PLASMONIC INTEGRATED CIRCUITS AND OPTICAL INTEGRATED CIRCUIT MODULE USING THE SAME

CROSS-REFERENCE TO RELATED APPLICATION

This application claims priority to and the benefit of Korean Patent Application Nos. 10-2008-0017307 filed in the Korean Intellectual Property Office on Feb. 26, 2008 and 10-2009-0003057 filed in the Korean Intellectual Property Office on Jan. 14, 2009, the entire contents of which are incorporated herein by reference.

BACKGROUND OF THE INVENTION

1. Field of the Invention

The present invention relates to a metal waveguide device, and nano plasmonic integrated circuits and an optical integrated circuit module using the same. More particularly, the present invention relates to a nano plasmonic integrated circuit module for converting optical signals into surface plasmon polariton (SPP) signals, transmitting the converted SPP signals, and sensing and processing the transmitted SPP signals.

2. Description of the Related Art

Recently, it has been experimentally confirmed that when a metal and a dielectric satisfy specific conditions at the boundary therebetween, optical waves interact with free electrons on the surface of the metal thus causing resonance. This resonance corresponds to resonance between the electromagnetic waves outside of the metal and the free electrons of the metal. Such resonance produces surface plasmons which are progressive waves of high-density electrons similar to when water waves travel along the surface. The surface plasmons or the SPPs indicate that light or photons travel along the surface in the form of being coupled with plasma at the interface between the metal and the dielectric.

If the optical waves incident in a transverse magnetic polarization mode on the interface between the metal and the dielectric satisfy a phase-matching configuration through an appropriate process, electron motion, namely plasma, may be caused on the surface of the metal, resulting in a near field on the interface between the metal and the dielectric. The surface plasmon waves may be made to have a magnitude of tens of $\mu m$ or more, and have the properties of a local near field having high intensity and specific dispersion and surface plasmon resonance. Plasmonics is the name for the research field dealing with such surface plasmon waves, including the study of making a waveguide for the surface plasmon waves, modulating the surface plasmon waves, and studying a plasmon source and a receiver, a distributor, a coupler, a reflective lattice, a filter, etc.

Research into novel devices using surface plasmons is being conducted by many groups and the results thereof are frequently reported in prominent journals. Based on such research, plasmonics technology for focusing electromagnetic waves to a very small structure to thus transfer them is expected to lead to super high speed computer chips or super high sensitivity sensing techniques.

An optoelectronic integrated circuit module or an optical integrated circuit module, which is presently available, is constructed to have an area ranging from ones to tens of $cm^2$. For example, an OADM (optical add/drop multiplexer) module has an area of ones of cm×ones of cm, and a photonic crystal integrated circuit module has at least an area of ones of $mm^2$ (ones of mm×ones of mm).

However, the OADM module and the photonic crystal integrated circuit module do not correspond to sub-micro devices which are under active study these days, and thus cannot be applied to nano technology. Therefore, micro circuits having an area of sub-$\mu m$ or less are required.

SUMMARY OF THE INVENTION

Therefore, the present invention has been made keeping in mind the problems encountered in the related art and provides a metal waveguide device, and nano plasmonic integrated circuits and an optical integrated circuit module using the same, thus realizing highly integrated photonic circuits having a micro structure, low power consumption, low price and a disposable use.

An aspect of the present invention provides a nano plasmonic integrated circuit module, including an input coupling unit for focusing optical signals input through an optical waveguide, converting the optical signals into SPP signals and outputting the SPP signals, an input focusing unit for focusing the SPP signals to nanoscale size, an SPP waveguide for transmitting the SPP signals, a signal sensing/processing unit for sensing and processing the SPP signals transmitted through the SPP waveguide, an output defocusing unit for defocusing the SPP signals and an output coupling unit for converting the SPP signals into optical signals.

The input coupling unit and the output coupling unit may include a dielectric taper waveguide for connecting the optical waveguide having a size of from ones of $\mu m$ to tens of $\mu m$ and the SPP waveguide having a width ranging from 10 nm to 10 $\mu m$ and a thickness less than 100 nm, and may have a large plate or a rod disposed therein and having a refractive index larger than that of a core. Also, in order to obtain an asymmetric mode, the end surface of the output end of the input coupling unit may be cut to be inclined at a predetermined angle.

The input focusing unit may be at least one selected from among a tapered channel metal waveguide, a tapered needle metal waveguide, a tapered semicircular needle metal waveguide, a Bragg grating metal waveguide, and a nanodot focusing array metal waveguide.

In the nano plasmonic integrated circuit module according to the present invention, a waveguide connection portion may be formed between the input focusing unit or the output focusing unit and the SPP waveguide. As such, in the waveguide connection portion, the input focusing unit and the SPP waveguide may be connected to each other and may have the same end surfaces as each other.

The SPP waveguide according to the present invention may include a metal line or double metal line having a thickness of ones to tens of nm and a width of ones to tens of $\mu m$, and may transmit the SPP signals in an SPP mode.

The SPP waveguide may include a metal line or double metal line in the form of at least one selected from among a straight line, a Y splitter, and a Mach-Zehnder interferometer. Also, the SPP waveguide may include a metal nanodot array at a branched or curved portion thereof, or may have a metal or dielectric Bragg grating.

The signal sensing/processing unit may be configured such that a part or an arm of the SPP waveguide is exposed to a cladding layer.

Another aspect of the present invention provides an optical integrated circuit module, including a light source, a nano plasmonic integrated circuit module for converting optical signals emitted from the light source into SPP signals, transmitting the SPP signals to a signal sensing/processing unit through an SPP waveguide for signal processing and then outputting the processed signals into optical signals, and a photo diode for sensing the output optical signals.

In this case, the SPP waveguide may guide the SPP signals in an SPP mode.

A further aspect of the present invention provides an optical integrated circuit module, including a light source, an input coupling unit for converting optical signals emitted from the light source into SPP signals, a nano plasmonic integrated circuit module for focusing the SPP signals, transmitting the SPP signals to a signal sensing/processing unit through an SPP waveguide for signal processing and then defocusing the SPP signals, an output coupling unit for converting the defocused SPP signals outgoing from the nano plasmonic integrated circuit module into optical signals, and a photo diode for sensing the output optical signals.

In this case, the input coupling unit and the output coupling unit of the optical integrated circuit module may include a dielectric taper waveguide for connecting the optical waveguide having a size of from ones to tens of μm and the SPP waveguide having a width of from ones to tens of μm and a thickness of from ones to tens of nm.

As such, the SPP waveguide may guide the SPP signals in an SPP mode.

Still a further aspect of the present invention provides a nano plasmonic integrated circuit module, including an input double metal taper for focusing optical signals input through an optical waveguide, converting the optical signals into SPP signals, and focusing the SPP signals to micron or nano sizes, an SPP waveguide for guiding the focused SPP signals, a signal sensing/processing unit for sensing and processing the SPP signals transmitted through the SPP waveguide, and an output double metal taper for defocusing the SPP signals, converting the defocused SPP signals into optical signals and outputting the optical signals.

The input double metal taper may include a first metal layer, an insulator layer formed on the first metal layer, and a second metal layer formed on the insulator layer and including a first end and a second end opposite the first end such that a width thereof gradually narrows going from the first end toward the second end, wherein mode conversion between the optical signals and the SPP signals occurs at the first end of the second metal layer, and the SPP signals having a size of from ones of μm to sub-μm are focused into SPP signals having a size of from ones to tens of μm or a nano size while traveling from the first end toward the second end.

In this case, the first metal layer or the second metal layer may be made of any one metal selected from among gold (Au), silver (Ag), aluminum (Al) and copper (Cu). The insulator layer may be made of any one material in which a change in refractive index is possible, such as silicon (Si), quartz (SiO₂), or a polymer. The width of the first metal layer and the insulator layer may gradually narrow going from the first end toward the second end which is opposite the first end. Also, the first metal layer and the insulator layer may be shaped like strips.

The SPP waveguide may be a double metal waveguide composed of a first metal layer, an insulator layer formed on the first metal layer, and a second metal layer formed on the insulator layer.

Still another aspect of the present invention provides a double metal waveguide device, including a first metal layer, an insulator layer formed on the first metal layer, and a second metal layer formed on the insulator layer and including a first end and a second end opposite the first end such that a width thereof gradually narrows going from the first end toward the second end, wherein mode conversion between optical signals and SPP signals occurs at the first end of the second metal layer, and the SPP signals having a size of from ones of μm to sub-μm are focused into SPP signals having a size of from ones to tens of μm or a nano size depending on the thickness of the insulator layer while traveling from the first end toward the second end.

In this case, the first metal layer or the second metal layer may be made of any one metal selected from among gold (Au), silver (Ag), aluminum (Al) and copper (Cu). The insulator layer may be made of silicon (Si), quartz (SiO₂), or a polymer. The width of the first metal and insulator layers may gradually narrow going from the first end toward the second end which is opposite the first end. Also, the first metal layer and the insulator layer may be shaped like strips.

DESCRIPTION OF THE PREFERRED EMBODIMENTS

Figure 1:
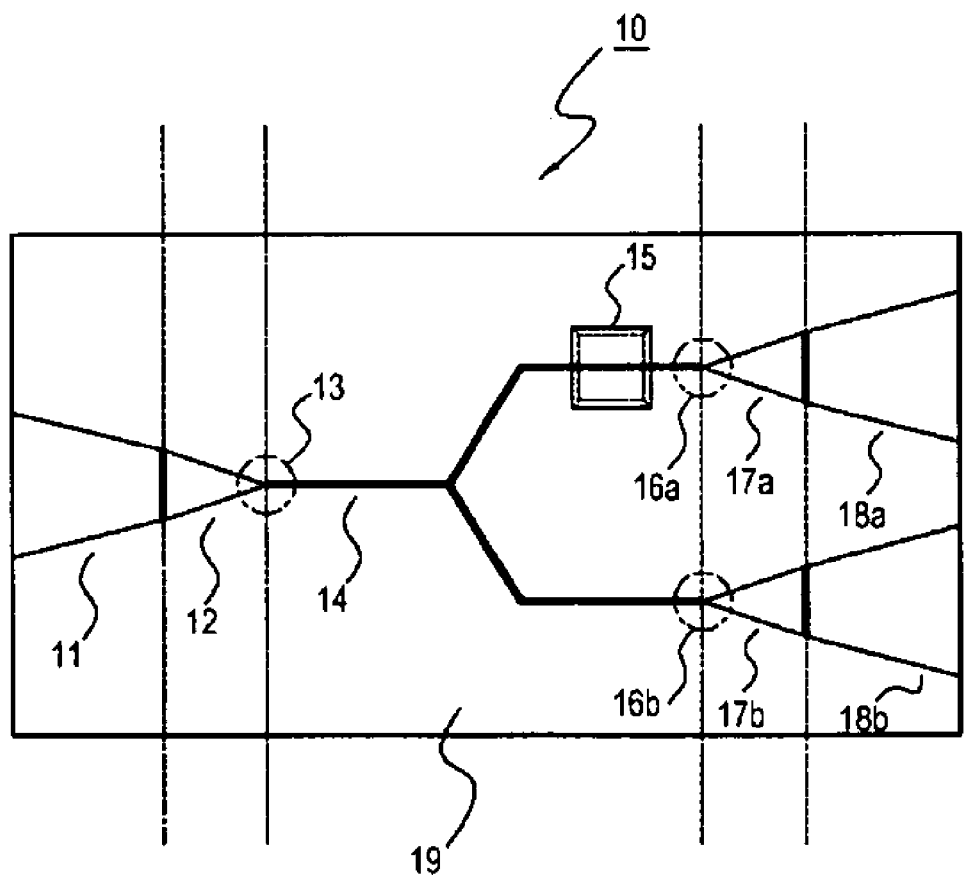
FIG. 1 shows a nano plasmonic integrated circuit module according to an embodiment of the present invention.

Hereinafter, a detailed description will be given of nano plasmonic integrated circuits and an optical integrated circuit module using the same according to the present invention.

The concept of nano plasmonic integrated circuits will now be described first. The nano plasmonic integrated circuit is a circuit formed by integrating a series of devices into one sub-mm sized chip, the series of devices being responsible for converting incident optical signals into SPP signals or producing them, transmitting the SPP signals through a waveguide, recognizing or sensing and processing the transmitted SPP signals, and converting the SPP signals back into the optical signals, which are then output. Below, the construction of the nano plasmonic integrated circuit is specifically described with reference to the drawing.

FIG. 1 shows the construction of a nano plasmonic integrated circuit module according to an embodiment of the present invention.

As shown in FIG. 1, the nano plasmonic integrated circuit module is constructed in a manner such that an input coupling unit 11, an input focusing unit 12, an SPP waveguide 14, a signal sensing/processing unit 15, output defocusing units 17a, 17b, output coupling units 18a, 18b, and waveguide connection portions 13, 16a, 16b are integrated on a substrate 19.

The input coupling unit 11 and the output coupling units 18a, 18b are responsible for coupling and conversion between the optical signals and the SPP signals. The input coupling unit 11 and the output coupling units 18a, 18b are more specifically described later, with reference to FIGS. 5A to 5E.

The input focusing unit 12 ensures that the SPP signals converted by the input coupling unit 11 are focused on a micron or nano scale and then input to the SPP waveguide 14. In contrast, the output defocusing units 17a, 17b ensure that the SPP signals transferred through the SPP waveguide 14 are defocused and then sent to the output coupling units 18a, 18b.

The SPP waveguide 14 acts as a waveguide for transmitting the SPP mode. The SPP waveguide 14 according to the present invention may be variously formed into a symmetric mode waveguide, an anti-symmetric mode waveguide, or a double metal waveguide, depending on the needs. The anti-symmetric SPP mode waveguide has a transmission distance ranging from tens to hundreds of μm, and has a mode size of from ones to hundreds of nm. The symmetric SPP mode waveguide has a transmission distance ranging from tens to hundreds of mm and has a mode size of from ones to hundreds of μm. The double metal waveguide has the SPP mode transmission distance and mode size similar to the above results.

Thus, for nanophotonic systems having dimensions on the sub-μm levels, among coupled SPP modes, an anti-symmetric mode is particularly useful, but has a high loss and is thus considerably limited in terms of the transmission distance. Below, with reference to FIGS. 8A and 8B, the symmetric mode and the anti-symmetric mode are specifically described.

Figure 8:
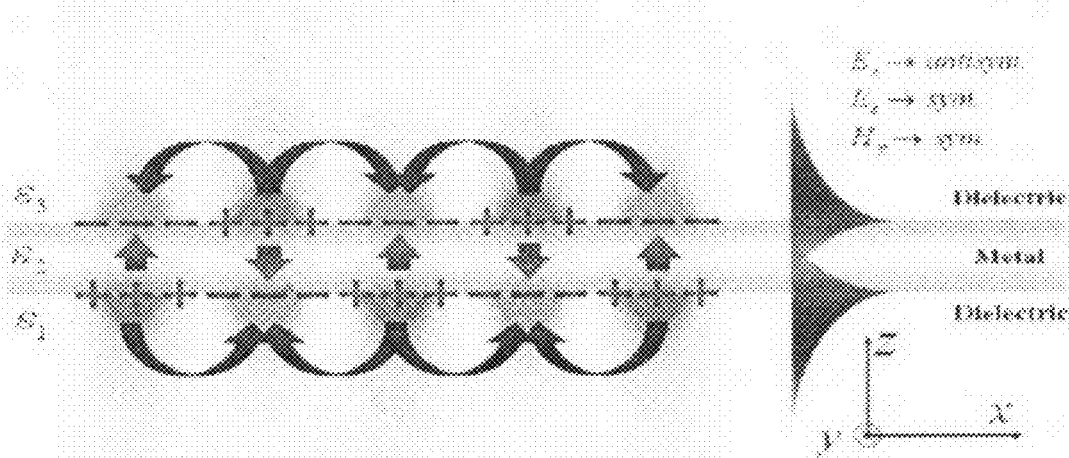
FIGS. 8A and 8B show the transmission mode of the nano SPP waveguide according to the present invention.
Figure 8:
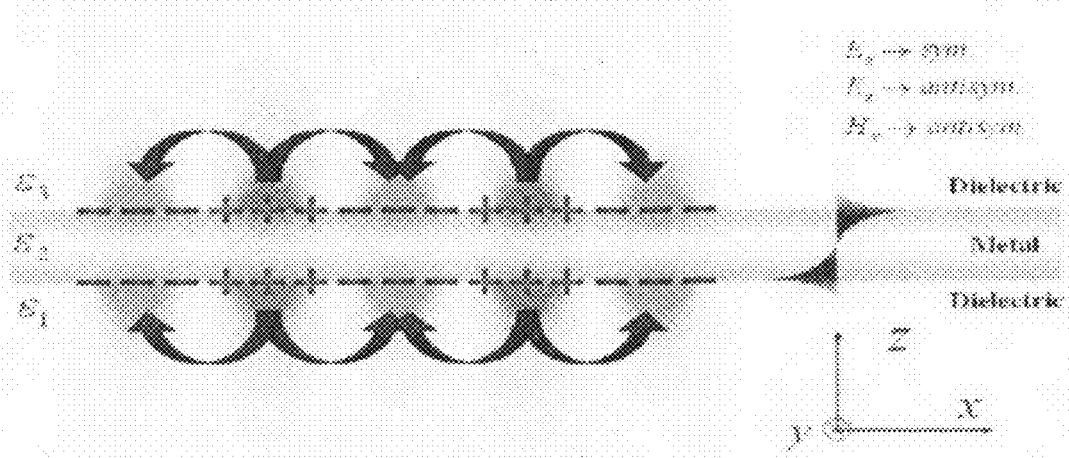

The waveguide of FIGS. 8A and 8B corresponds to a waveguide where thin metal is located between two dielectrics. The width of the metal ranges from about 10 nm to about 10 μm, and the thickness thereof is less than 100 nm.

The symmetric SPP mode waveguide as illustrated in FIG. 8A operates in a super mode through coupling of the SPPs formed on upper and lower planes of the metal. The plane symmetric mode of FIG. 8A has low transmission loss and may thus be adequate for long-distance transmission. Also, the symmetric SPP mode is a μm-size mode, and may thus be applied to a sub-mm sized nano plasmonic integrated circuit.

The anti-symmetric SPP mode waveguide as illustrated in FIG. 8B operates in a plane-asymmetric mode, unlike the waveguide of FIG. 8A. The plane-asymmetric mode may operate in a nm-size mode, and is thus adequate for use in a nano plasmonic integrated circuit having a sub-μm size. Although the anti-symmetric mode has high loss, the transmission distance of the nano plasmonic integrated circuit module is very short to the extent of from the nano scale to ones of μm in scale, and therefore the high loss of the anti-symmetric mode is not regarded as problematic.

In the case where the mode of FIG. 8B is adopted, the SPP waveguide may be formed using a single metal line or double metal line having a thickness less than 100 nm and a width ranging from 10 nm to 10 μm. This waveguide may have a specific shape to exhibit various functions, and the description thereof is given later, with reference to FIGS. 7A to 7G.

The signal sensing/processing unit 15 is a device for sensing or processing the SPP signals. The signal sensing/processing unit 15 may be configured such that a cladding layer is exposed to a part or an arm of the SPP waveguide.

Among the waveguide connection portions 13, 16a, 16b, the waveguide connection portion 13 is formed between the input focusing unit and the SPP waveguide, and the waveguide connection portions 16a, 16b are formed between the SPP waveguide and the output defocusing units.

In the waveguide connection portion 13, the end surfaces of the input focusing unit 12 and the SPP waveguide 14 have the same cross-section so as to form a seamless connection therebetween. Likewise, in the waveguide connection portions 16a, 16b, the end surfaces of the SPP waveguide 14 and the output defocusing units 17a, 17b have the same cross-section so as to form a seamless connection therebetween.

Figure 2:
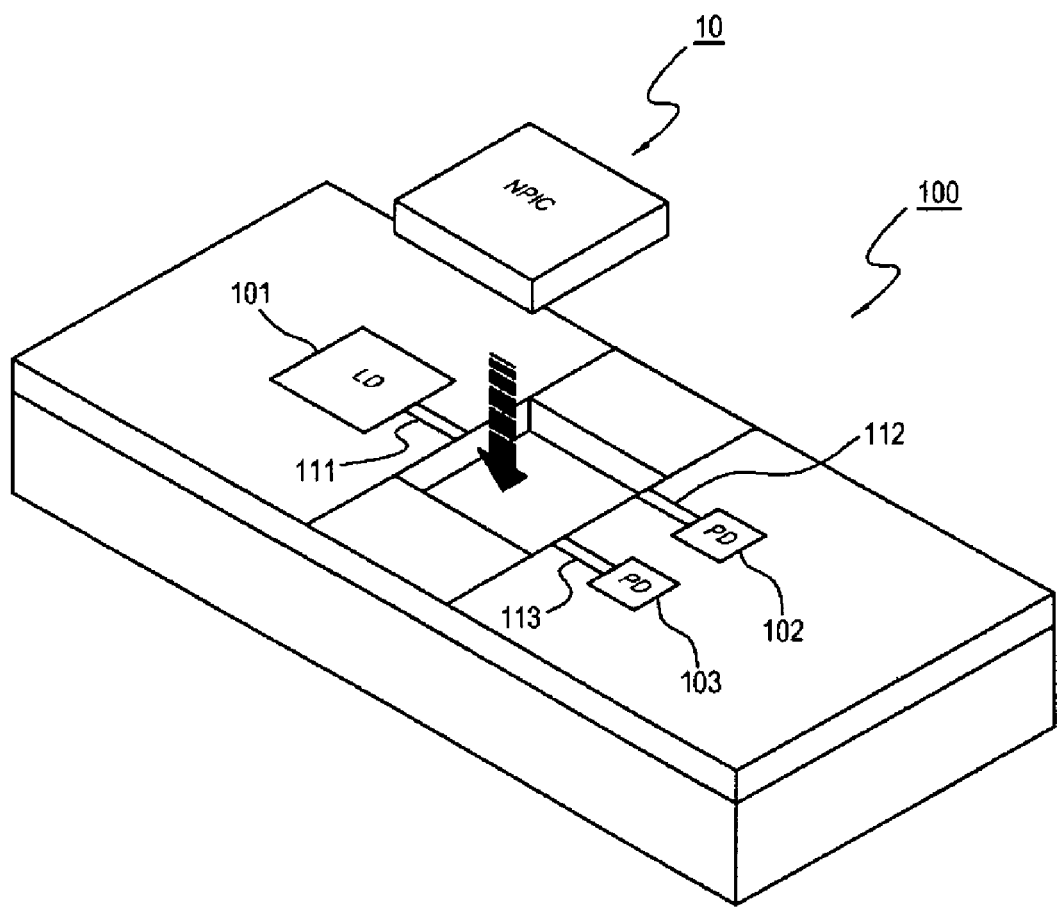
FIG. 2 shows an optical bench using the nano plasmonic integrated circuit module of FIG. 1.

FIG. 2 shows an optical bench using the nano plasmonic integrated circuit module of FIG. 1.

As shown in this drawing, the optical bench 100 of FIG. 2 includes the nano plasmonic integrated circuit module 10 of FIG. 1. Also, the optical bench 100 of FIG. 2 further includes a light source 101 such as a laser diode (LD), photo diodes (PDs) 102, 103, and optical waveguides 111, 112, 113.

As illustrated in FIG. 2, the light source 101, for example an LD, outputs a laser for signal processing. This laser corresponds to the input optical signals. The input optical signals are input to the nano plasmonic integrated circuit module 10 of FIG. 1 through the input optical waveguide 111.

In this case, the input optical signals passed through the optical waveguide 111 are transferred to the input coupling unit 11 of the nano plasmonic integrated circuit module 10 of FIG. 1. Then, the transferred optical signals are converted into the SPP signals by the input coupling unit 11 of the nano plasmonic integrated circuit module 10.

Then, the nano plasmonic integrated circuit module 10 performs focusing, transmission, sensing and processing of the SPP signals. Further, the nano plasmonic integrated circuit module 10 defocuses the SPP signals and transfers the defocused SPP signals to the output coupling units 18a, 18b.

The output coupling units 18a, 18b function conversely to the input coupling unit 11 and convert the SPP signals into optical signals and output the converted optical signals through the output optical waveguides 112, 113.

The optical bench of FIG. 2 includes two output optical waveguides 112, 113. This is because the nano plasmonic integrated circuit module 10 of FIG. 1 is configured such that the input signals branch to output two optical signals.

As such, the number of input/output waveguides 111, 112, 113 of the optical bench 10 and the number of input/output signals of the nano plasmonic integrated circuit module 10 may be freely adjusted, as is apparent to those skilled in the art.

Figure 3:
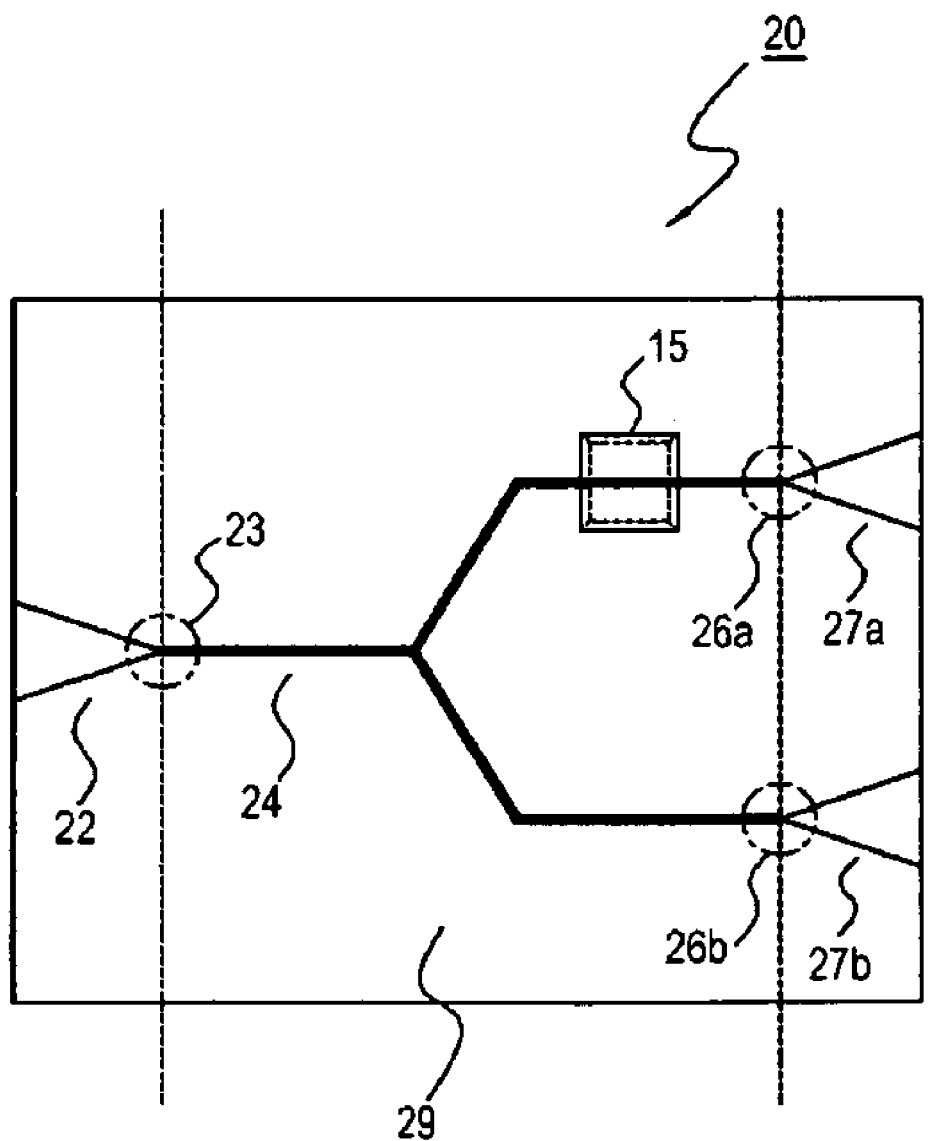
FIG. 3 shows a nano plasmonic integrated circuit module according to another embodiment of the present invention.

FIG. 3 shows a nano plasmonic integrated circuit module according to another embodiment of the present invention.

The nano plasmonic integrated circuit module 20 of FIG. 3 has a construction similar to that of the nano plasmonic integrated circuit module 10 of FIG. 1. The nano plasmonic integrated circuit module 20 of FIG. 3 includes an input focusing unit 22, an SPP waveguide 24, a signal sensing/processing unit 25, output defocusing units 27a, 27b, and waveguide connection portions 23, 26a, 26b.

As mentioned with regard to FIG. 1, the input focusing unit 22 of FIG. 3 functions to focus the SPP signals before inputting them to the SPP waveguide 24. On the other hand, the output defocusing units 27a, 27b function to defocus the SPP signals transferred through the SPP waveguide 24.

The SPP waveguide 24 acts as a waveguide for transmitting the SPP signals, as in FIG. 1. The structure of the SPP waveguide 24 is almost the same as that of the SPP waveguide 14 of FIG. 1, and thus the detailed description thereof is omitted.

Likewise, the signal sensing/processing unit 25 is a device for sensing or processing the SPP signals, as in FIG. 1. The signal sensing/processing unit 25 may be configured such that a cladding layer is exposed to a part or an arm of the SPP waveguide.

In the waveguide connection portion 23, the end surfaces of the input focusing unit 22 and the SPP waveguide 24 have the same cross-section so as to form a seamless connection therebetween. Also, in the waveguide connection portions 26a, 26b, the end surfaces of the SPP waveguide 24 and the output defocusing units 27a, 27b have the same cross-section so as to form a seamless connection therebetween.

Figure 4:
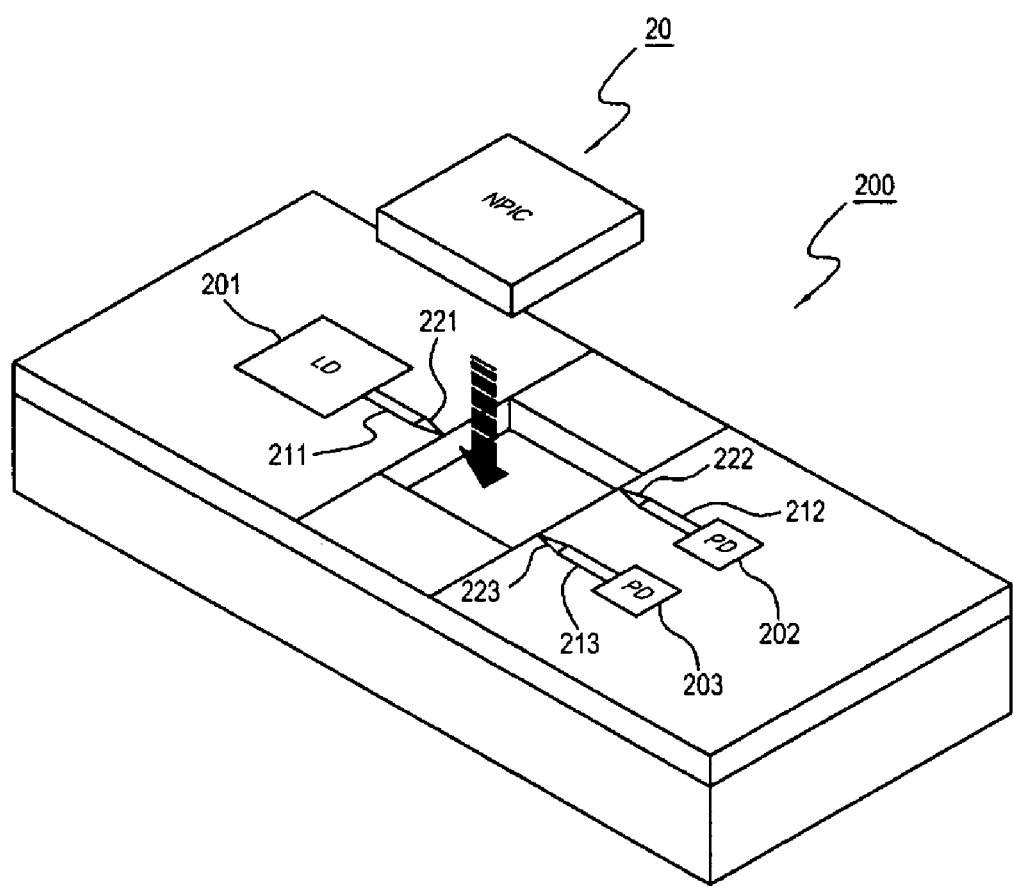
FIG. 4 shows an optical bench using the nano plasmonic integrated circuit module of FIG. 3.

FIG. 4 shows an optical bench including the nano plasmonic integrated circuit module of FIG. 3.

As shown in this drawing, the optical bench 200 of FIG. 4 includes the nano plasmonic integrated circuit module 20 of FIG. 3, a light source 201 such as an LD, PDs 202, 203, and optical waveguides 211, 212, 213.

Also, the optical bench 200 of FIG. 4 further includes an input coupling unit 221 and output coupling units 222, 223 for connecting the optical waveguides 211, 212, 213 which are dielectric to the nano plasmonic integrated circuit module.

In the optical bench of FIG. 4, the light source 201, the PDs 202, 203, and the optical waveguides 211, 212, 213 perform almost the same functions as those of the light source 101, the PDs 102, 103, and the optical waveguides 111, 112, 113 of FIG. 2, and thus the detailed description thereof is omitted.

The input coupling unit 221 of FIG. 4 converts the optical signals into the SPP signals, like the input coupling unit 11 of FIG. 1. Also, the output coupling units 222, 223 of FIG. 4 convert the SPP mode into the optical mode and perform functions similar to those of the output coupling units 18a, 18b of FIG. 1.

FIGS. 5A to 5E illustrate various examples of the input/output coupling units 11, 18a, 18b of FIG. 1 or the input/output coupling units 221, 222, 223 of FIG. 4.

The input/output coupling units 11, 18a, 18b of FIG. 1 or the input/output coupling units 221, 222, 223 of FIG. 4 appropriately introduce light emitted from the light source 101, 201 to the SPP waveguide through the optical fibers or the optical waveguide, so that the optical mode is converted into the SPP mode.

The optical fibers or the optical waveguide have a physical size ranging from ones to tens of μm. The SPP waveguide has a thickness less than 100 nm and a width ranging from 10 nm to 10 μm.

In the present invention, in order to realize efficient butt coupling between the optical waveguide and the SPP waveguide which are different in size, a dielectric waveguide having any structure as illustrated in FIGS. 5A to 5D is proposed. The devices illustrated in FIGS. 5A to 5E may be used as the input/output coupling units 11, 18a, 18b of FIG. 1 or the input/output coupling units 221, 222, 223 of FIG. 4.

Figure 5:
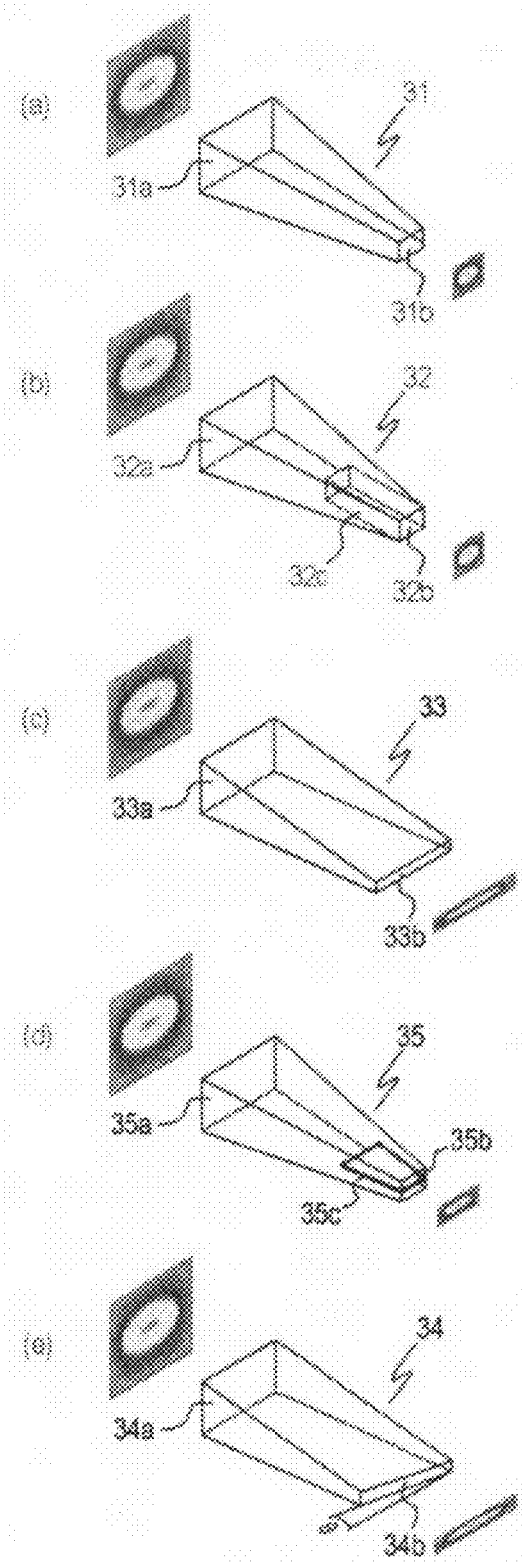
FIGS. 5A to 5E show examples of the input/output coupling units of FIG. 1 or the input/output coupling units of FIG. 4.

The waveguide of FIG. 5A includes an input end and an output end each having an end surface in an approximate square shape, with the exception that the length of each side of the input end is about tens of μm, and the length of each side of the output end is about ones of nm. This waveguide enables the optical mode to be focused in the form of a square.

The waveguide of FIG. 5B has a structure in which a thin rod having a refractive index larger than that of a core is horizontally disposed in the waveguide of FIG. 5A. In the case where not strong but weak bonding occurs at the output end of the waveguide of FIG. 5A, the thin rod is disposed as illustrated in FIG. 5B, thereby solving the above problem.

The waveguide of FIG. 5C includes an input end and an output end each having a rectangular end surface much wider than it is long. Like the case of FIG. 5B, the waveguide of FIG. 5D has a structure in which a very thin plate having a refractive index much greater than that of a core is disposed for the purpose of focusing the optical mode in a horizontal direction (width direction) and creating strong bonding.

Finally, the waveguide of FIG. 5E has a structure in which the end surface of the output end is formed to be inclined at a predetermined angle ($\theta$). The cutting of the output end at a predetermined angle ($\theta$) (the output end may also be cut in a vertical direction, in addition to the horizontal direction) is intended to match the wave vector.

The optical signals incident on the input end of the waveguide of FIGS. 5A to 5E are focused through the waveguide, and then converted and output into the SPP signals at the output end of the waveguide. This means that the waveguide of FIGS. 5A to 5C or the input/output unit functions to convert the optical mode into the SPP mode.

FIGS. 6A to 6E illustrate various examples of a nano SPP waveguide type input focusing device according to the present invention.

The input focusing unit 12, 22 of FIG. 1 or 2 may include the nano SPP waveguide type input focusing device as illustrated in FIGS. 6A to 6E. The input focusing device functions to gradually reduce the SPP mode to a nano size and to transfer it to the SPP waveguide 14, 24.

Figure 6:
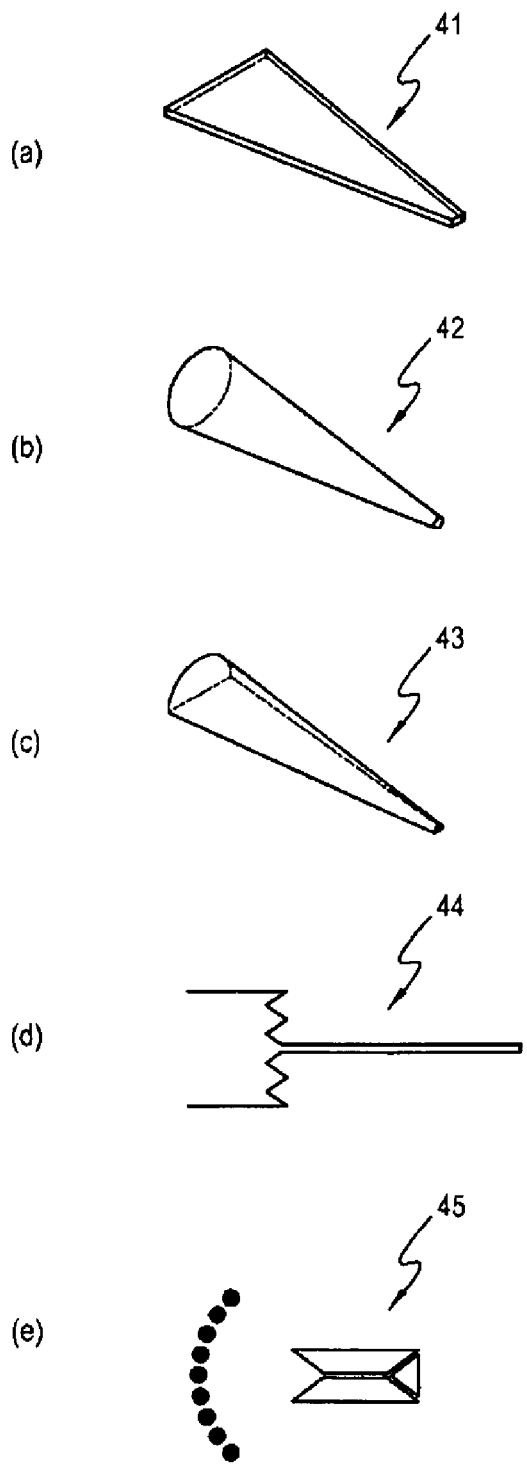
FIGS. 6A to 6E show examples of a nano SPP waveguide input focusing device according to the present invention.

The device 41 of FIG. 6A is a tapered channel metal waveguide, and the device 42 of FIG. 6B is a tapered needle metal waveguide. The device 43 of FIG. 6C is a tapered semicircular needle metal waveguide, and the device 44 of FIG. 6D is a Bragg grating metal waveguide. The device 45 of FIG. 6E is a nanodot focusing array metal waveguide.

Using the device as illustrated in FIGS. 6A to 6E, the input coupling unit 11, 21 may reduce the produced SPP signals at the nanoscale size.

In the nano plasmonic integrated circuit module 10, 20 of FIG. 1 or 3, the output defocusing units 17a, 17b, 27a, 27b have functions opposite to the function of the input focusing unit 12, 22 of the nano surface plasmonic integrated circuit module 10, 20. This opposite function may be realized when the output defocusing units 17a, 17b, 27a, 27b have a structure which is inverted from the structure of the device of FIGS. 6A to 6E.

FIGS. 7A to 7G illustrate various examples of the nano SPP waveguide and the signal sensing/processing unit which have been combined with each other.

Figure 7:
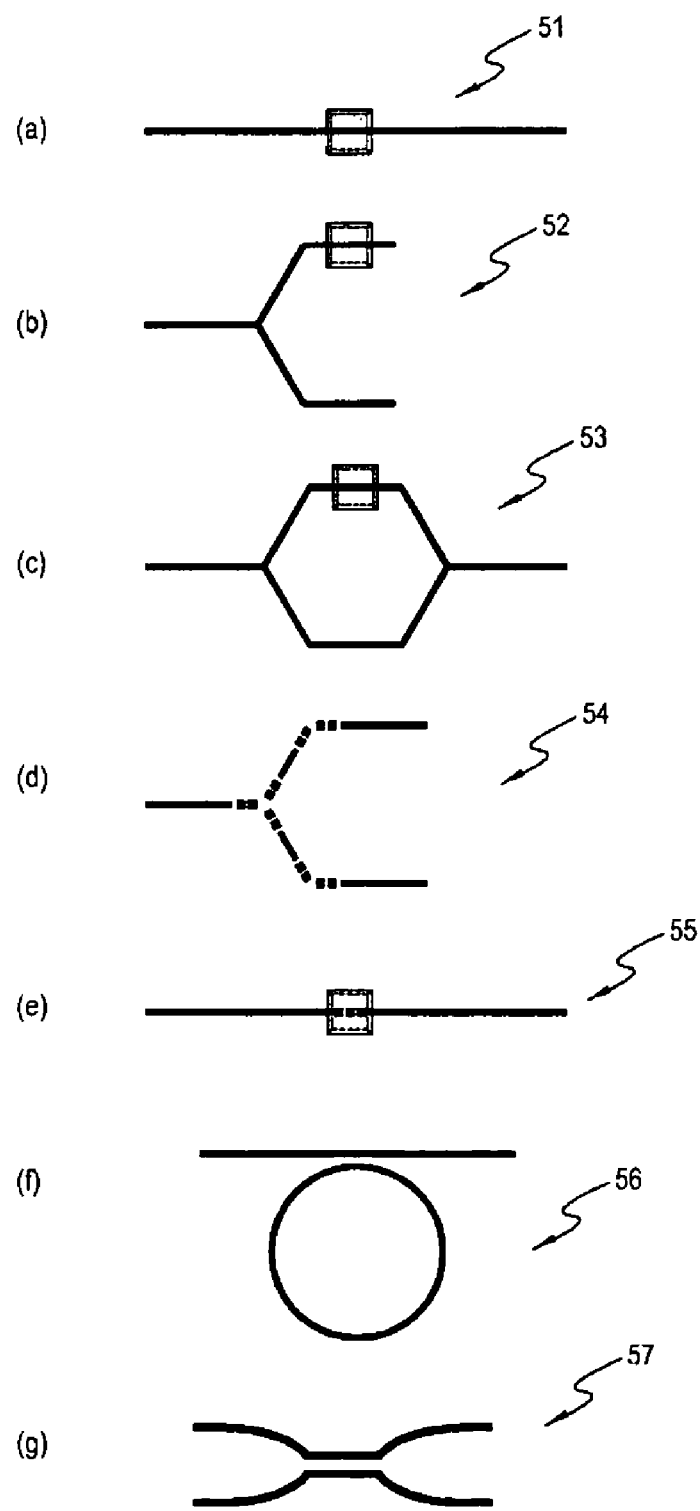
FIGS. 7A to 7G show examples of the nano SPP waveguide and the signal sensing/processing unit, which have been combined with each other.

The signal sensing/processing unit may be configured such that a part or an arm of the SPP waveguide as illustrated in FIGS. 7A to 7C is exposed to a cladding layer, and thus may operate in response to a change in refractive index of a material to be sensed.

In the waveguide 51 of FIG. 7A, the signal sensing/processing unit 15, 25 may be present in a predetermined position or part of a waveguide 51 in a straight linear form.

In FIG. 7B, the signal sensing/processing unit 15, 25 may be located in one arm of an SPP waveguide 52 in the form of a Y splitter.

In FIG. 7C, the signal sensing/processing unit may be located in one arm of an SPP waveguide 53 in the form of a Mach-Zehnder interferometer.

In FIG. 7D, a metal nanodot array instead of the metal line may be applied to the branched or curved portion of a waveguide 54, thus drastically reducing the entire size of the nano plasmonic integrated circuit module. The reason is that the metal nanodot array may refract the SPP signals at a better angle.

In FIG. 7E, a metal or dielectric Bragg grating may be introduced to an SPP waveguide 55 in order to increase the sensing efficiency. The dotted line in the signal sensing/processing unit represents the use of the dielectric Bragg grating.

FIG. 7F illustrates a waveguide 56 using a ring resonator. If the ring waveguide of FIG. 7F does not satisfy resonance conditions, the combination between the two waveguides does not occur, and thus the signals incident on the linear waveguide are transferred without change to the output end of the linear waveguide. In contrast, if the ring waveguide satisfies the resonance conditions, the signals incident on the linear waveguide are transferred to the ring waveguide and thus the signal power at the output end of the linear waveguide is reduced.

FIG. 7G illustrates a waveguide 57 using a directional coupler.

FIGS. 9A and 9B illustrate a nano plasmonic double metal waveguide device according to a further embodiment of the present invention.

As shown in FIG. 9A, the double metal waveguide device 60 includes an input double metal taper 61, a double metal waveguide 62, and an output double metal taper 63.

As illustrated in FIG. 9A, the input double metal taper 61 plays a role in appropriately applying light having a size ranging from ones of μm to sub-μm, which is emitted from a light source 81 (FIG. 11) and transferred through the optical waveguide, to the double metal waveguide 62. Specifically, the input double metal taper 61 performs mode conversion of the optical signals having a size of from ones of μm to sub-μm into the SPP signals having a size of from ones to tens of μm or a nano size, depending on the thickness of the insulator layer.

Conversely, the output double metal taper 63 performs mode conversion of the SPP signals having a size of from ones to tens of μm or a nano size transferred through the double metal waveguide 62, into the optical signals having a size of from ones of μm to sub-μm, depending on the thickness of the insulator layer, so that the optical signals thus converted are input to the optical waveguide.

The double metal waveguide 62 acts as a waveguide for guiding the optical signals in SPP mode. The double metal waveguide 62 also has an metal-insulator-metal (MIM) structure composed of a lower metal layer, an insulator layer and an upper metal layer, like the double metal tapers 61, 63.

Below, the input and output double metal tapers 61, 63 are specifically described.

As shown in FIG. 9A, the input double metal taper 61 consists of an upper metal layer 61 having a planar wedge or tapered shape in which the width thereof gradually becomes smaller from a first end toward a second end which is opposite the first end.

The optical waveguide (not shown) connected to the input and output double metal tapers 61, 63 has a physical size of from ones of μm to sub-μm. The double metal waveguide 62 has a width of from thousands to tens of nm and a thickness of from hundreds to tens of nm. The SPP mode may have a size of from ones of μm to tens of nm, depending on the thickness of the insulator layer of the double metal waveguide 62.

The large surface of the input double metal taper 61 is connected to the optical fibers or the optical waveguides having a size of from ones of μm to sub-μm, and has a size corresponding thereto. Likewise, the narrow surface of the input double metal taper 61 is connected to the double metal waveguide 62 having a size of tens of nm, and thus has a size of from hundreds to tens of nm corresponding thereto.

The optical signals input to the large surface having a sub-μm size are converted into SPP signals having a size of ones of μm to sub-μm. The SPP signals are focused into SPP signals having a size of from hundreds to tens of nm depending on the thickness of the insulator layer while traveling through the input double metal taper 61 having a tapered shape in which the dimension is gradually reduced, and the SPP signals thus focused are input to the double metal waveguide 62.

The output double metal taper 63 has a planar geometric shape in which the width thereof gradually widens going from the first end toward the second end opposite the first end, like a planar wedge or tapered shape. The input double metal taper 61 and the output double metal taper 63 are configured to be bilaterally symmetrical.

The SPP signals having a size of from hundreds to tens of nm input to the narrow surface of the output double metal taper 63, conversely to the input double metal taper 61, are defocused into the optical signals having a size of from ones of μm to sub-μm while traveling through the output double metal taper 63. The defocused SPP signals having a size of from ones of μm to sub-μm are converted into the optical signals at the large surface of the output double metal taper 63, and then the optical signals thus obtained are input to the optical fibers or the optical waveguides.

In the vertical structure of the input and output double metal tapers 61, 63, as illustrated in FIG. 9B, a metal layer 64, an insulator layer 65, and a metal layer 66 are sequentially formed upwards. This structure including the metal layer, the insulator layer and the metal layer is referred to as MIM.

The material for the metal layer 64, 66 is selected from among metals such as gold (Au), silver (Ag), copper (Cu), and aluminum (Al). The insulator layer 65 is made of an insulator in which a change in refractive index is possible, such as silicon (Si), quartz ($SiO_2$), or a polymer.

The lower metal layer 64 and the insulator layer 65 may have the same planar wedge shape as the upper metal layer 66. Alternatively, the insulator layer 65 and the lower metal layer 64 may be formed to have a shape different from the planar wedge or tapered shape of the upper metal layer 66 while stacking with the upper metal layer 66.

For example, as shown in FIG. 9A, the lower metal layer 64 may have a rectangular planar shape, namely, a strip shape, different from the tapered shape of the upper metal layer 66.

The vertical structure of the double metal taper 61, 63 may be inverted. For example, in the double metal taper, the lower metal layer 64 may have a waveguide pattern having a wedge or tapered shape, and the upper metal layer 66 may have a strip shape.

The optical signals having a size of from ones of μm to sub-μm transferred through the optical waveguide having a size of from ones of μm to sub-μm are converted into SPP signals having a size of from ones of μm to sub-μm depending on the thickness of the insulator layer at the large surface of the double metal taper 61, 63. Further, the SPP signals are focused into SPP signals having a size of from ones to tens of μm or a nano size while traveling through the double metal taper 61.

Accordingly, the SPP signals having a size of from thousands to hundreds of nm at the input end of the double metal taper 61 are focused into the SPP mode having a size of from hundreds to tens of nm at the output end thereof, thus minimizing the focusing coupling loss between the SPP modes.

Figure 10:
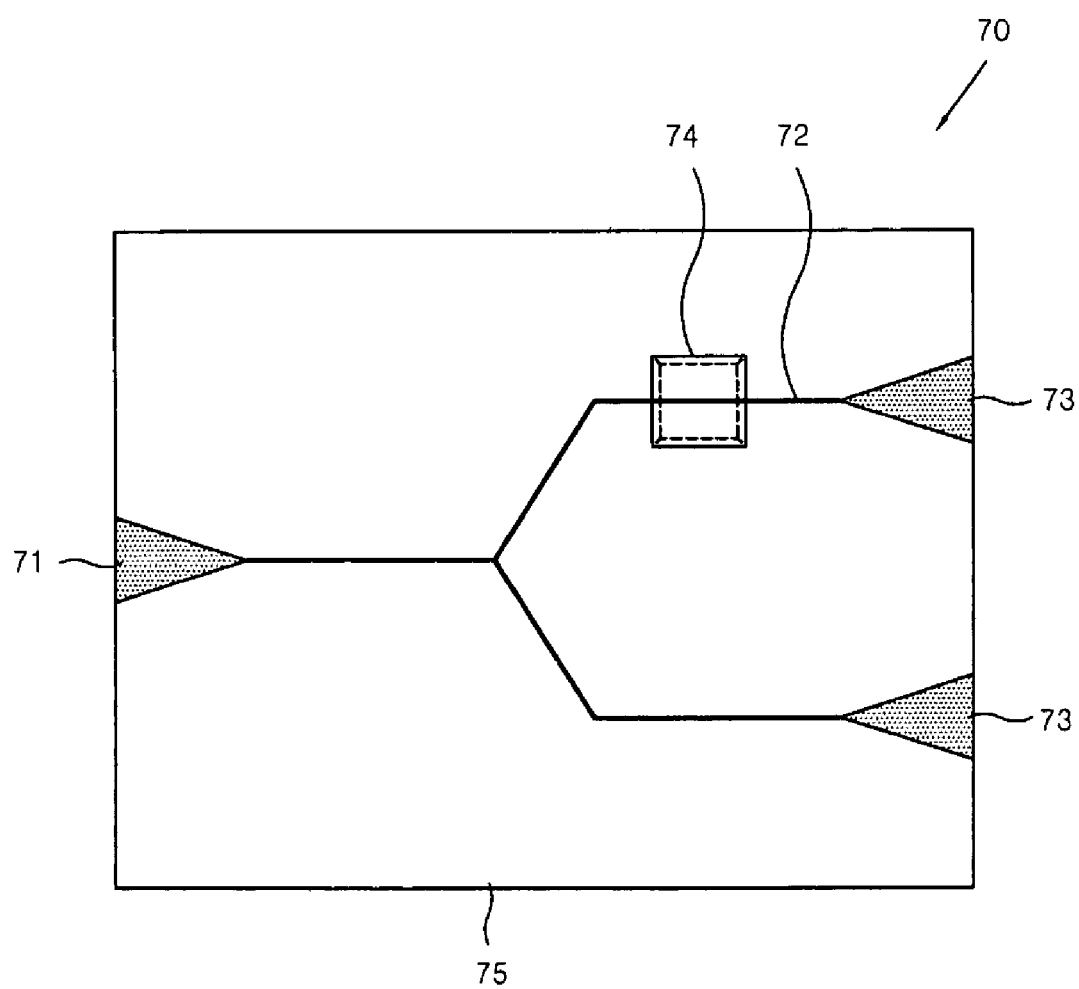
FIG. 10 shows a nano plasmonic integrated circuit module according to still a further embodiment of the present invention.

FIG. 10 is a top plan view showing a nano plasmonic integrated circuit module according to still a further embodiment of the present invention.

The nano plasmonic integrated circuit module 70 of FIG. 10 includes an input double metal taper 71, double metal waveguides 72, output double metal tapers 73, and a signal sensing/processing unit 74, which are integrated on a substrate 75.

Figure 9:
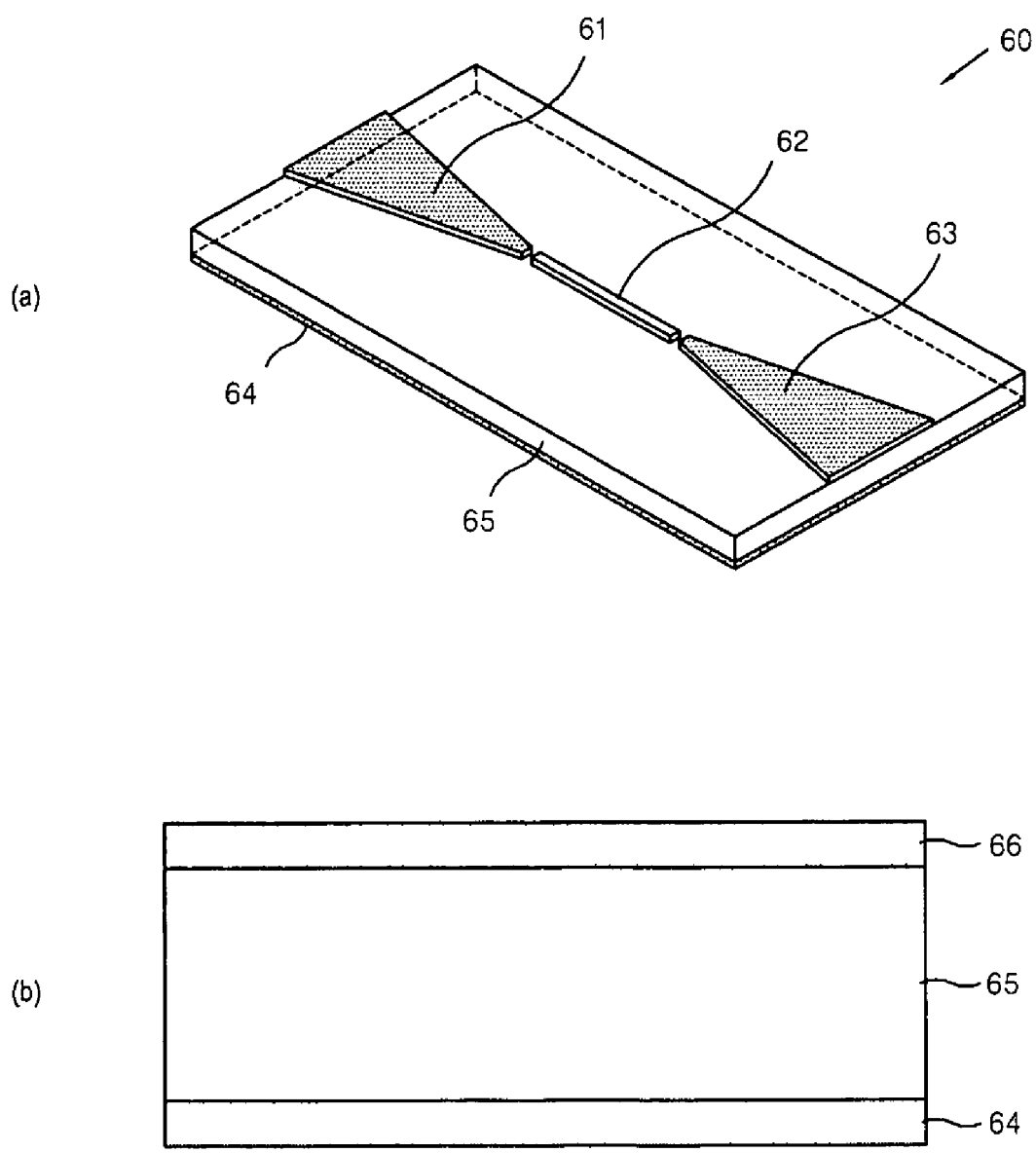
FIGS. 9A and 9B show a nano plasmonic double metal waveguide device according to a further embodiment of the present invention.

The nano plasmonic integrated circuit module 70 of FIG. 10 is formed by adding the signal sensing/processing unit 74 to the construction of the double metal waveguide device 60 of FIG. 9.

The signal sensing/processing unit 74 is a device for sensing the SPP signals or performing predetermined signal processing. The signal sensing/processing unit 74 may be configured such that a cladding layer is exposed to a part or an arm of the double metal waveguide. The signal sensing/processing unit 74 is specifically described later, with reference to FIGS. 13A to 13G.

Figure 11:
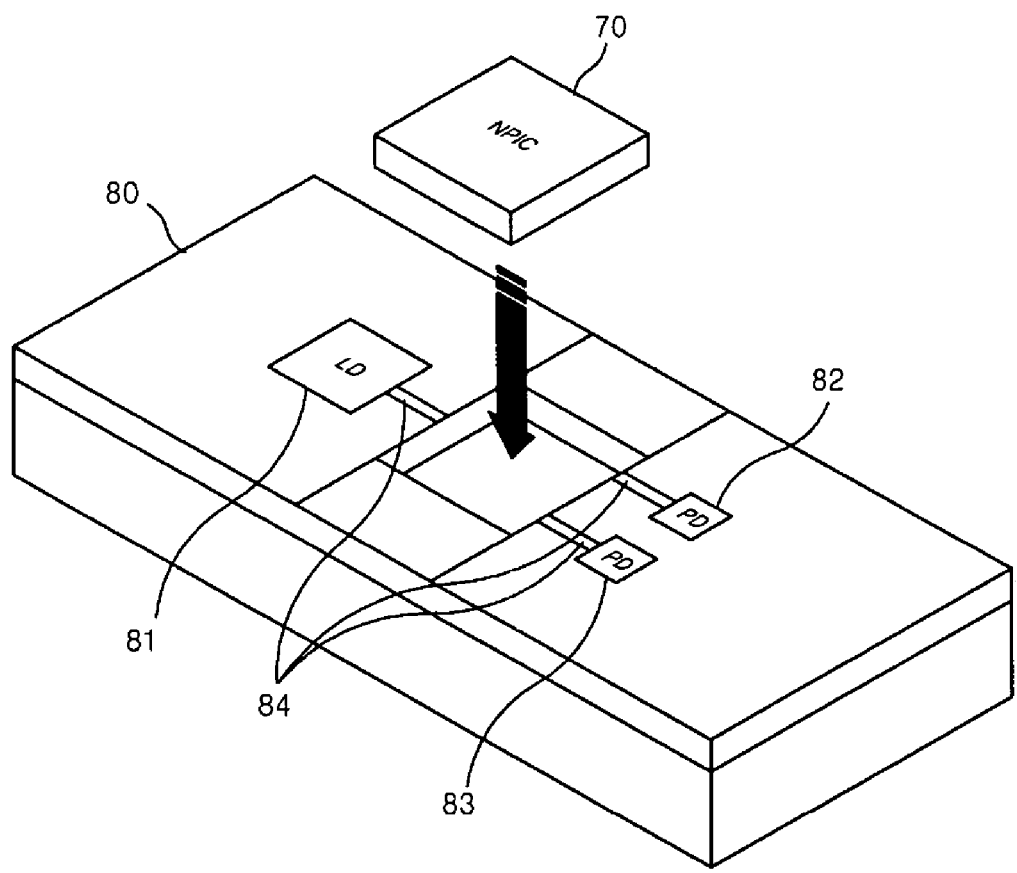
FIG. 11 shows an optical bench using the nano plasmonic integrated circuit module of FIG. 10.

FIG. 11 shows an optical bench using the nano plasmonic integrated circuit module of FIG. 10.

As shown in FIG. 11, the optical bench 80 includes the nano plasmonic integrated circuit module 70 of FIG. 10. Also, the optical bench 80 of FIG. 11 further includes a light source 81 such as an LD, and PDs 82, 83.

In FIG. 11, the light source 81 such as the LD 81 outputs a laser for signal processing. This laser corresponds to the input optical signals. The input optical signals are input to the input double metal taper 71 of the nano plasmonic integrated circuit module 70.

The input double metal taper 71 of the nano plasmonic integrated circuit module 70 converts the input optical signals into SPP signals, focuses the SPP signals, and transfers the focused SPP signals to the double metal waveguide 72.

The SPP signals are transferred through the double metal waveguide 72. The signal sensing/processing unit 74 senses the SPP signals having a size of tens of nm, transferred through the double metal waveguide 72, and performs signal processing.

The output double metal taper 73 of the nano plasmonic integrated circuit module 70 defocuses the SPP signals having a size of tens of nm and mode converts them into optical signals which are then transferred to the optical fibers or the optical waveguides. The optical signals transferred to the optical fibers or the optical waveguides in this way are sent to the PDs 82, 83.

The optical bench 80 of FIG. 11 has two photo diodes 82, 83. This is because the nano plasmonic integrated circuit module 70 of FIG. 10 is constructed such that the input signals branch to output two optical signals. Also, the number of double metal tapers 71, 73 contained in the nano plasmonic integrated circuit module 70 of FIG. 10 may be freely adjusted, as is apparent to those skilled in the art.

Figure 12:
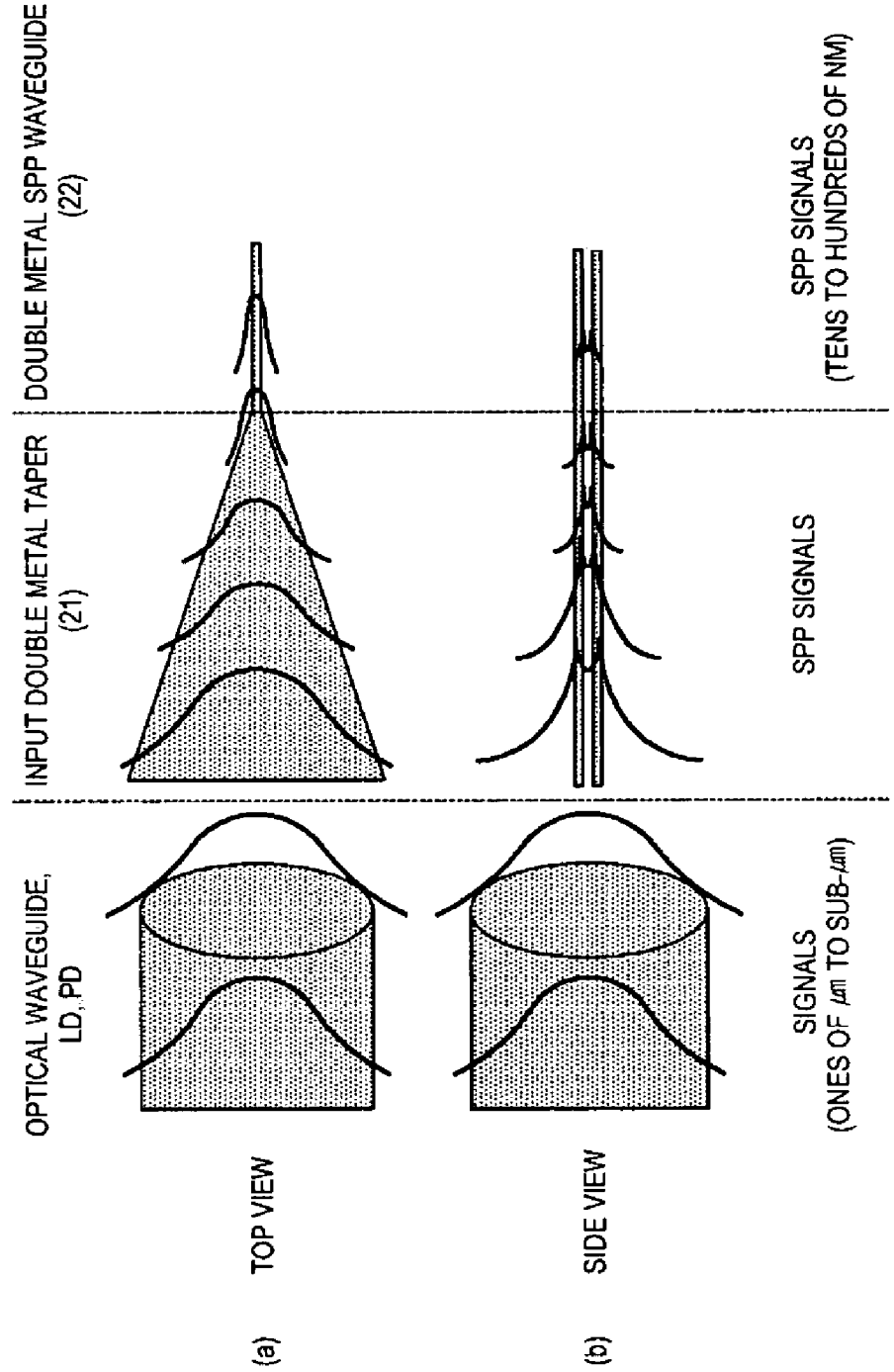
FIGS. 12A and 12B show optical signals which are transferred through the optical bench of FIG. 11.

FIGS. 12A and 12B show the optical signals transferred through the optical bench of FIG. 11.

As illustrated in the top view of FIG. 12A, the optical signals having a sub-μm size are transferred through the optical waveguide, the LD, and the PD. The optical signals having a sub-μm size are input to the large surface of the first end of the input double metal taper 71.

The optical signals are converted into the SPP signals having a size of from ones of μm to sub-μm at the large surface of the input double metal taper 71. The SPP signals are focused into SPP signals having a size of from hundreds to tens of nm while traveling through the input double metal taper 71. That is, the SPP signals are focused while traveling through the input double metal taper 71.

The focused SPP signals having a size of tens of nm are input to the double metal waveguide 72 from the input double metal taper 71, and the SPP signals travel through the double metal waveguide 72.

On the other hand, as illustrated in the side view of FIG. 12B, the input double metal taper 71 and the double metal waveguide 72 can be seen to have an MIM structure composed of metal-insulator-metal. As the signals input from the fibers or the optical waveguides are focused depending on the structure of the double metal taper, the mode size can be seen to gradually decrease.

The signals transferred from the input double metal taper 71 to the double metal waveguide 72 correspond to the optical signals focused in the range from about 20 nm to about 30 nm.

FIGS. 13A to 13G illustrate various examples of the double metal waveguide and the signal sensing/processing unit, which are combined with each other.

Figure 13:
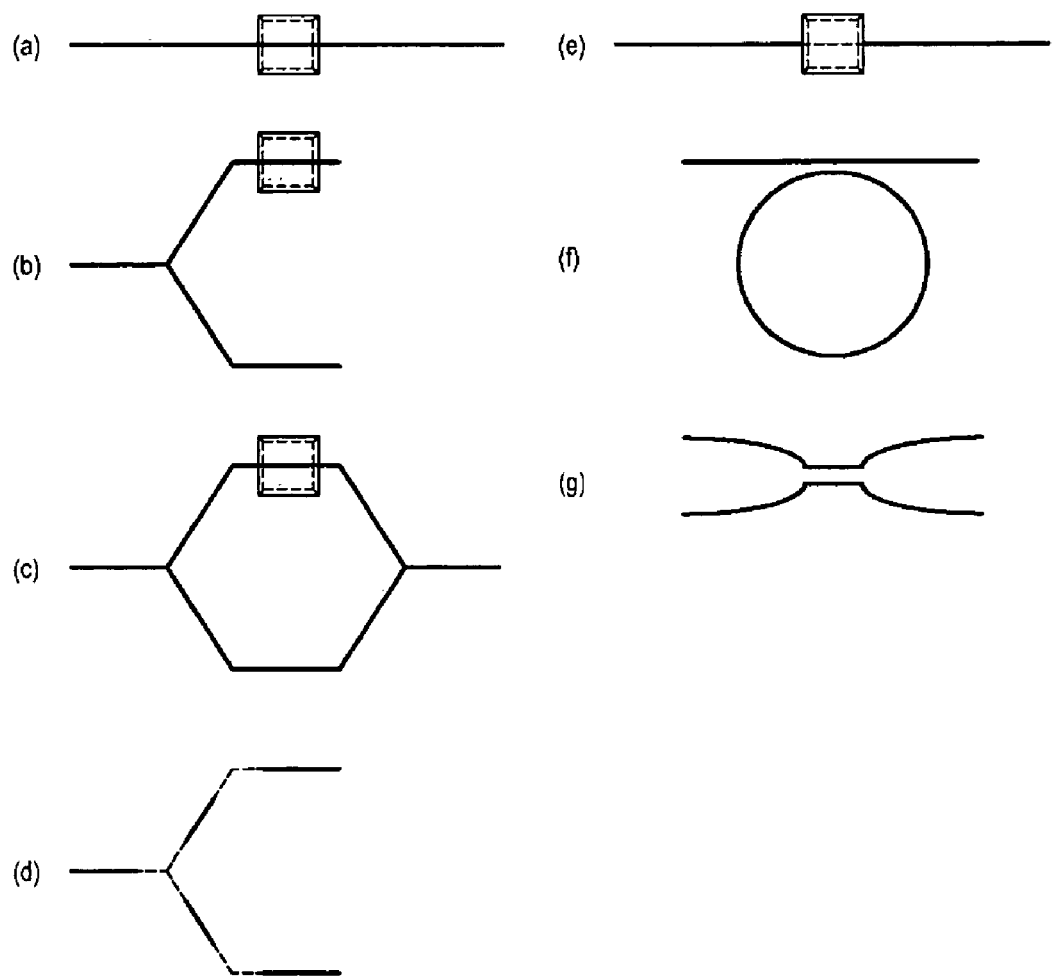
FIGS. 13A to 13G show examples of the double metal waveguide and the signal sensing/processing unit, which have been combined with each other.

The signal sensing/processing unit 74 may be configured such that a part or an arm of the double metal waveguide as illustrated in FIGS. 13A to 13C is exposed to a cladding layer, and thus may operate in response to the change in the refractive index of a material to be sensed.

In FIG. 13A, the signal sensing/processing unit 74 may be present in a predetermined position or part of a double metal waveguide in a straight linear form.

In FIG. 13B, the signal sensing/processing unit 74 may be located at one arm of a double metal waveguide in the form of a Y splitter.

In FIG. 13C, the signal sensing/processing unit 74 may be located at one arm of a double metal waveguide in the form of a Mach-Zehnder interferometer.

In FIG. 13D, a metal nanodot array instead of the metal line may be applied to the branched or curved portion of a waveguide, and thus, the entire size of the nano plasmonic integrated circuit can be drastically reduced. This is because the metal nanodot array may favorably refract the SPP signals at a better angle.

In FIG. 13E, in order to increase the sensing efficiency, a metal or dielectric Bragg grating may be introduced to an SPP waveguide 72. The dotted line in the signal sensing/processing unit 74 represents the use of the dielectric Bragg grating.

FIG. 13F illustrates a double metal waveguide using a ring resonator. If the ring waveguide of FIG. 13F does not satisfy the resonance conditions, the combination between the two waveguides does not occur, and thus the signals incident on the linear waveguide are transferred without change to the output end of the linear waveguide. In contrast, if the ring waveguide satisfies the resonance conditions, the signals incident on the linear waveguide are transferred to the ring waveguide and thus the signal power at the output end of the linear waveguide is reduced.

FIG. 13G illustrates a waveguide using a directional coupler.

As described hereinbefore, the present invention provides a nano plasmonic integrated circuit module and an optical integrated circuit module using the same. According to the present invention, the nano plasmonic integrated circuit module able to solve problems related to the diffraction limit of light and the RC delay of electrons can be used as a medium between a nanophotonic device and a nanoelectronic device, thus realizing highly integrated photonic circuits such as an optical integrated circuit module having a micro structure, low power consumption and low price.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A nano plasmonic integrated circuit module, comprising:
   an input coupling unit for focusing optical signals input through an optical waveguide, converting the focused optical signals into surface plasmon polariton signals, and outputting the surface plasmon polariton signals;
   an input focusing unit for focusing the output surface plasmon polariton signals to a nano size;
   a surface plasmon polariton waveguide for transmitting the focused surface plasmon polariton signals;
   a signal sensing/processing unit for sensing and processing the surface plasmon polariton signals transmitted through the surface plasmon polariton waveguide;
   an output defocusing unit for defocusing the surface plasmon polariton signals; and
   an output coupling unit for converting the defocused surface plasmon polariton signals into optical signals.

2. The nano plasmonic integrated circuit module as set forth in claim 1, wherein the input coupling unit comprises a dielectric taper waveguide for connecting the optical waveguide having a size of from ones of μm to tens of μm and the surface plasmon polariton waveguide having a width of from 10 nm to 10 μm and a thickness less than 100 nm.

3. The nano plasmonic integrated circuit module as set forth in claim 2, wherein the input coupling unit has a plate disposed therein and having a refractive index larger than that of a core.

4. The nano plasmonic integrated circuit module as set forth in claim 2, wherein the input coupling unit has an output end having an end surface which is formed to be inclined at a predetermined angle.

5. The nano plasmonic integrated circuit module as set forth in claim 1, wherein the input focusing unit is at least one selected from among a tapered channel metal waveguide, a tapered needle metal waveguide, a tapered semicircular needle metal waveguide, a Bragg grating metal waveguide, and a nanodot focusing array metal waveguide.

6. The nano plasmonic integrated circuit module as set forth in claim 1, wherein a waveguide connection portion is formed between the input focusing unit and the surface plasmon polariton waveguide.

7. The nano plasmonic integrated circuit module as set forth in claim 6, wherein, in the waveguide connection portion, the input focusing unit and the surface plasmon polariton waveguide are connected to each other and have end surfaces identical to each other.

8. The nano plasmonic integrated circuit module as set forth in claim 1, wherein the output coupling unit comprises a dielectric taper waveguide for connecting the optical waveguide having a size of from ones of μm to tens of μm and the surface plasmon polariton waveguide having a width of from 10 nm to 10 μm and a thickness less than 100 nm.

9. The nano plasmonic integrated circuit module as set forth in claim 1, wherein a waveguide connection portion is formed between the surface plasmon polariton waveguide and the output defocusing unit.

10. The nano plasmonic integrated circuit module as set forth in claim 9, wherein, in the waveguide connection portion, the surface plasmon polariton waveguide and the output defocusing unit are connected to each other and have end surfaces identical to each other.

11. The nano plasmonic integrated circuit module as set forth in claim 1, wherein the surface plasmon polariton waveguide comprises a metal line or double metal line having a width of from 10 nm to 10 μm and a thickness less than 100 nm.

12. The nano plasmonic integrated circuit module as set forth in claim 1, wherein the surface plasmon polariton waveguide transmits the surface plasmon polariton signals in a surface plasmon polariton mode.

13. The nano plasmonic integrated circuit module as set forth in claim 1, wherein the surface plasmon polariton waveguide comprises a metal line or double metal line in a form of at least one selected from among a straight line, a Y splitter, and a Mach-Zehnder interferometer.

14. The nano plasmonic integrated circuit module as set forth in claim 1, wherein the surface plasmon polariton waveguide further comprises a metal nanodot array at a branched or curved portion thereof.

15. The nano plasmonic integrated circuit module as set forth in claim 1, wherein the surface plasmon polariton waveguide comprises a metal or dielectric Bragg grating.

16. The nano plasmonic integrated circuit module as set forth in claim 1, wherein the signal sensing/processing unit is configured such that a part or an arm of the surface plasmon polariton waveguide is exposed to a cladding layer.

17. A nano plasmonic integrated circuit module, comprising:
   an input double metal taper for focusing optical signals input through an optical waveguide, converting the focused optical signals into surface plasmon polariton signals, and focusing the surface plasmon polariton signals to a size of from ones of μm to tens of μm or to a nano size;
   a surface plasmon polariton waveguide for transmitting the focused surface plasmon polariton signals;
   a signal sensing/processing unit for sensing and processing the surface plasmon polariton signals transmitted through the surface plasmon polariton waveguide; and
   an output double metal taper for defocusing the surface plasmon polariton signals, converting the defocused surface plasmon polariton signals into optical signals, and outputting the optical signals.

18. The nano plasmonic integrated circuit module as set forth in claim 17, wherein the input double metal taper or the output double metal taper comprises:
   a first metal layer;
   an insulator layer formed on the first metal layer; and
   a second metal layer formed on the insulator layer and including a first end and a second end opposite the first end such that a width thereof gradually narrows going from the first end toward the second end,
   wherein mode conversion between the optical signals and the surface plasmon polariton signals occurs at the first end of the second metal layer, and the surface plasmon polariton signals having a size of from ones of μm to sub-μm are focused into surface plasmon polariton signals having a size of from ones of μm to tens of μm or a nano size while traveling from the first end toward the second end.

19. The nano plasmonic integrated circuit module as set forth in claim 18, wherein the first metal layer or the second metal layer is made of any one metal selected from among gold (Au), silver (Ag), aluminum (Al) and copper (Cu).

20. The nano plasmonic integrated circuit module as set forth in claim 18, wherein the insulator layer is made of any one material selected from among silicon (Si), quartz ($SiO_2$), and a polymer.

21. The nano plasmonic integrated circuit module as set forth in claim 18, wherein the first metal layer and the insulator layer include the first end and the second end opposite the first end such that the width thereof gradually narrows going from the first end toward the second end.

22. The nano plasmonic integrated circuit module as set forth in claim 18, wherein the first metal layer and the insulator layer have a strip shape.

23. The nano plasmonic integrated circuit module as set forth in claim 17, wherein the surface plasmon polariton waveguide is a double metal waveguide, comprising a first metal layer, an insulator layer formed on the first metal layer, and a second metal layer formed on the insulator layer.

* * * * *